United States Patent [19]

Meadows

[11] Patent Number: 4,756,390
[45] Date of Patent: Jul. 12, 1988

[54] REMOTE BRAKING SYSTEM

[76] Inventor: Leon Meadows, 804 Bunny Rabbit Rd., Athens, Tex. 75751

[21] Appl. No.: 73,686

[22] Filed: Jul. 15, 1987

[51] Int. Cl.⁴ .......................... B60T 7/20; B60T 13/00
[52] U.S. Cl. .................................. 188/3 H; 188/3 R; 303/7; 303/15; 303/49
[58] Field of Search ................... 188/3 R, 3 H; 303/7, 303/49, 15

[56] References Cited

U.S. PATENT DOCUMENTS

| | | | |
|---|---|---|---|
| 1,770,194 | 7/1930 | Bragg et al. | 188/3 |
| 1,826,414 | 10/1931 | Bragg et al. | 303/7 |
| 2,145,661 | 1/1939 | Mayer et al. | 188/3 |
| 2,674,349 | 4/1954 | Phillips | 188/3 |
| 3,275,381 | 9/1966 | Pfeifer | 303/7 |
| 3,395,946 | 8/1968 | Medley et al. | 303/8 |
| 3,650,570 | 3/1972 | Meeks | 303/7 |
| 3,768,870 | 10/1973 | Howard | 188/3 R |
| 3,771,838 | 11/1973 | Rossigno et al. | 303/7 |
| 3,790,807 | 2/1974 | Rossigno | 303/7 |
| 3,856,362 | 12/1974 | Howard | 303/7 |
| 3,856,363 | 12/1974 | Kasselmann | 303/7 |
| 3,887,238 | 6/1975 | Bennett | 188/3 |
| 3,915,507 | 10/1975 | Kasselmann et al. | 303/7 |
| 3,948,567 | 4/1976 | Kasselmann et al. | 303/7 |
| 3,984,149 | 10/1976 | Reinecke et al. | 188/3 |
| 3,990,749 | 11/1976 | Mizen et al. | 303/24 |
| 4,023,863 | 5/1977 | Sisson et al. | 303/7 |
| 4,398,771 | 8/1983 | McCurrey et al. | 303/15 |
| 4,635,758 | 1/1987 | Beard, Jr. | 188/3 |

Primary Examiner—Andres Kashnikow
Assistant Examiner—Mark T. Le
Attorney, Agent, or Firm—Richards, Harris, Medlock & Andrews

[57] ABSTRACT

An improved remote braking system (10, 100) is provided which allows simultaneous actuation of the braking system of a motor home (12) and an automobile (14) towed behind the motor home. An advantage of the present invention is the incorporation of the system within the self-contained hydraulic brake system of the automobile, which permits the braking system of the automobile to be operated in the normal manner. The system includes an actuator (26, 102) which is secured between the vacuum booster (18) and the master cylinder (20) of the automobile. Within the actuator is a piston (38, 114) which separates the interior of the actuator into two chambers. A pressure differential is created between the chambers when the brakes of the motor home are applied to generate a force on the piston (38, 114), to apply the brakes of the towed automobile as well. The system is operable with either air brakes or hydraulic brakes in the motor home.

7 Claims, 3 Drawing Sheets

REMOTE BRAKING SYSTEM

TECHNICAL FIELD

This invention relates to a safety system which allows simultaneous application of the brakes of a towing vehicle and a towed vehicle.

BACKGROUND OF THE INVENTION

Many people today own and operate motor homes. Unfortunately, such motor homes are typically large and expensive to operate and awkward to maneuver. More and more, people are towing a conventional automobile behind the motor home, which allows the motor home to be driven to a convenient location, such as an RV site, and the automobile used for local trips.

Virtually every state requires a braking system on the trailing vehicle which is operated by applying the brakes of the towing vehicle. Conventional trailers have been equipped with electric brake systems, inertia brake systems, and even hydraulic brake systems tied to the towing vehicle. Each of these braking systems is specifically designed to cooperate with the braking system of the towing vehicle.

In contrast, an automobile towed by a motor home has its own self-contained braking system. Usually this system is a closed hydraulic circuit with a master cylinder that is activated by an operator depressing the brake pedal. Typically, a vacuum booster is incorporated between the brake pedal and master cylinder which employs vacuum drawn from the intake manifold of the automobile to assist the braking action. It has proven impossible to the present day to provide a commercially acceptable system to connect the brake system of the motor home to an automobile being towed to allow simultaneous application of the brakes in both vehicles. Unfortunately, most motor home operators today simply ignore the state laws and operate their vehicles with no braking action from the automobile in tow. The consequences in both property damage and personal injury from this practice is clear.

Attempts have been made in the past to operate the braking system of a towed vehicle where the vehicle towed has its own self-contained braking system. For example U.S. Pat. No. 4,398,771 to McCurry, et al discloses a braking system for a towed vehicle. U.S. Pat. No. 2,674,349 to Phillips discloses a brake connection system between two automobiles which requires the hydraulic circuit of the vehicle being towed to be rerouted. Clearly, a need exists for a system for simultaneously applying brakes between the towing and towed vehicle when the towed vehicle has a self-contained braking system.

SUMMARY OF THE INVENTION

In accordance with one aspect of the present invention, an apparatus is provided for applying the brakes of a vehicle under tow simultaneously with the brakes of the towing vehicle. The vehicle under tow has a hydraulic braking system employing a master cylinder and a vacuum booster. The apparatus includes a cylinder mounted between the master cylinder and the vacuum booster and a piston in slidable sealing contact with the inner wall of the cylinder, dividing the interior of the cylinder into first and second chambers. A first member is operably connected to the vacuum booster for transferring brake application forces from the vacuum booster. A second member is operably connected to the master cylinder for transferring brake application forces to the master cylinder. The first and second members are operably connected to transfer brake application forces from the vacuum booster to the master cylinder when the towed vehicle is independently operated. Structure is provided for inducing a pressure differential between the first and second chambers of the cylinder in response to the application of the brakes of the towing vehicle to exert a force on the piston, the piston in turn exerting a force on the second member to apply the brakes of the towed vehicle.

In accordance with another aspect of the present invention, the towing vehicle has air brakes. An air line connects the brake system of the towing vehicle to the first chamber of the cylinder. The second chamber is opened to atmospheric pressure.

In accordance with another aspect of the present invention, the towing vehicle has hydraulic brakes. A vacuum is drawn in both the first and second chambers of the cylinder from the intake manifold of the towing vehicle through a vacuum regulator valve. Application of the hydraulic brakes of the towing vehicle vents the first chamber to the atmosphere at the vacuum regulator valve to apply the brakes of the towed vehicle.

BRIEF DESCRIPTION OF THE DRAWINGS

For a more complete understanding of the present invention, and for further advantages thereof, reference is now made to the following Detailed Description, taken in conjunction with the accompanying drawings, wherein.

DETAILED DESCRIPTION

With reference now to the accompanying drawings, and more specifically to FIGS. 1-3, a first embodiment of the present invention, forming a remote braking system 10, will be described.

Figure 1:
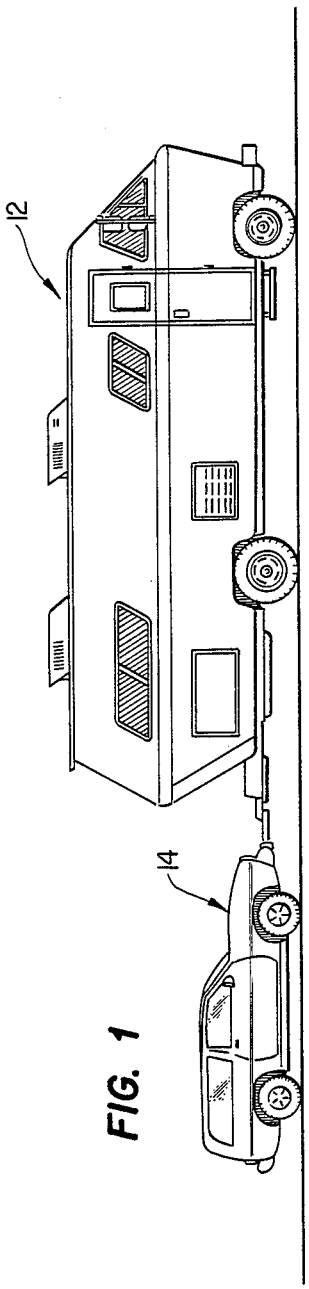
FIG. 1 is an illustrative view of a motor home and car towed therebehind incorporating the present invention.

FIG. 1 illustrates a typical application of the present invention where a motor home 12 tows a conventional automobile 14. The present invention provides a system for applying the brakes of the automobile 14 when the brakes of the motor home 12 are applied, satisfying state laws regarding the braking systems for a trailing vehicle and providing significant safety advantages. For example, a 22,500 lb. motor home towing a 3,100 lb. automobile travelling at 60 mph will take 320 feet to stop at full braking capability without application of the brakes on the automobile. In contrast, the stopping distance can be reduced to 205 feet if the brakes on the automobile are applied simultaneously with the brakes of the motor home. While the present invention has specific application to a motor home towing an automobile, it will be understood that the present invention can be applied to any environment where a vehicle is towed.

Figure 2:
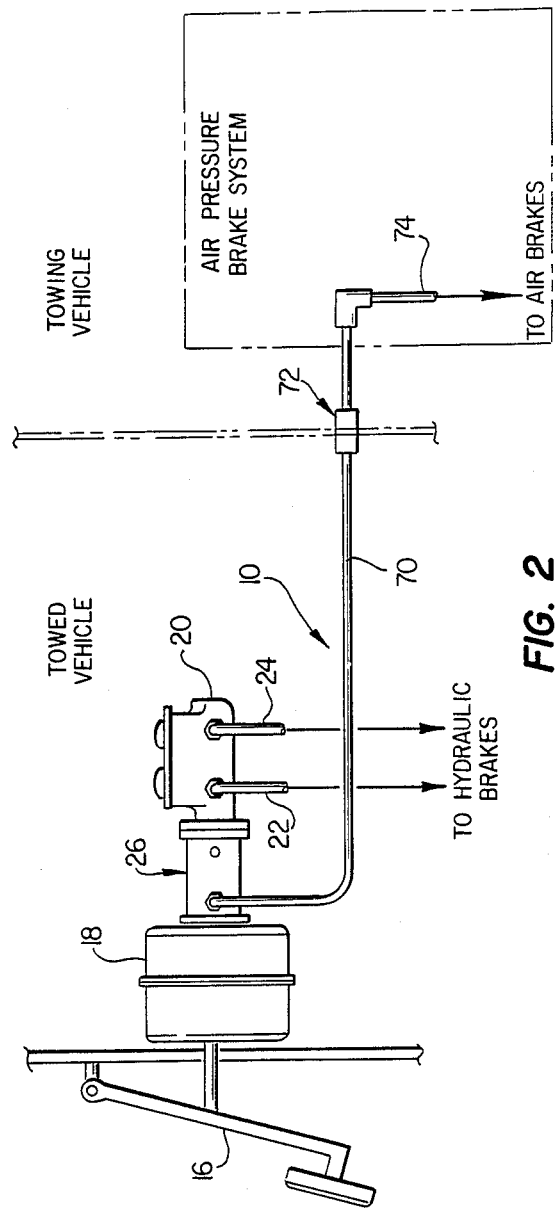
FIG. 2 is a schematic illustration of a first embodiment of the present invention for use when the towing vehicle has air brakes.
Figures 3, 5:
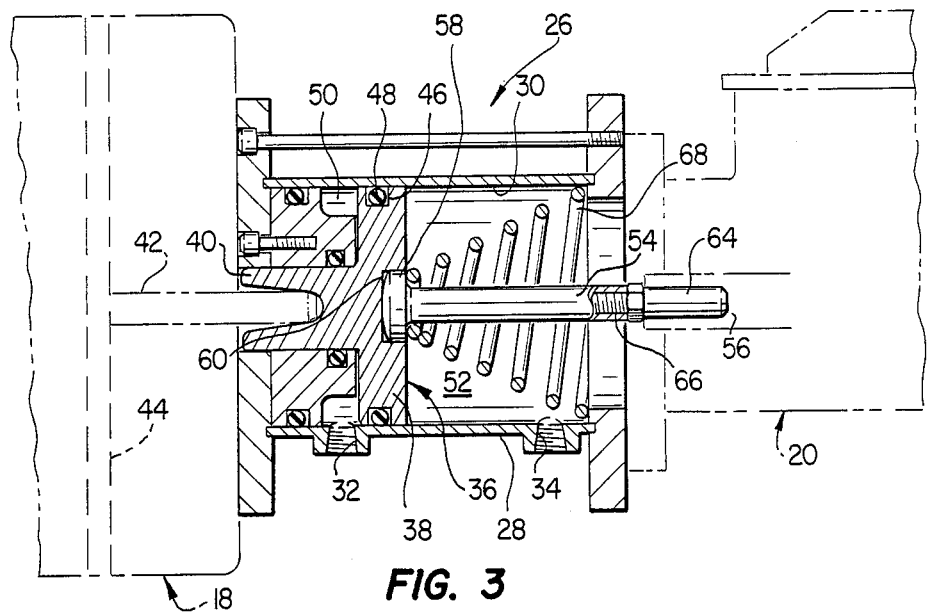
FIG. 3 is a partial cross-sectional view of the actuator of the first embodiment.
FIG. 5 is a partial cross-sectional view of the actuator used in the second embodiment.

With reference now specifically to FIGS. 2 and 3, the system 10 will be described. System 10 is designed for use with a motor home having an air operated braking system. In such a system, depressing the brake pedal of the motor home will direct pressurized air at about 120 psi to the brakes of the motor home.

The automobile being towed will typically have a hydraulic brake system which includes a brake pedal 16, a vacuum booster 18, and a hydraulic master cylinder 20. As is well understood, the brakes of automobile 14 are applied by the operator by depressing pedal 16. The vacuum booster 18 is connected to the intake manifold of the automobile which draws a vacuum within the booster. A piston 44 is slidable within the booster. A valve within the booster is operated as the brake pedal is depressed to vent a portion of the booster to generate a force on the piston which enhances the braking force applied by the operator on the pedal. These braking forces are then applied to a piston 56 within the master cylinder 20 which pressurizes hydraulic fluid in lines 22 and 24 to apply the braking forces through the wheel cylinders.

The system 10 of the present invention includes an actuator 26 which is bolted between the vacuum booster 18 and the master cylinder 20. The actuator 26 includes a cylinder 28 having an inner wall 30. Ports 32 and 34 are formed through the cylinder.

An assembly 36 is positioned within the cylinder 28 and includes a piston 38 and a rod portion 40. The rod portion 40 extends toward, or even into, the vacuum booster 18 to receive piston shaft 42 connected to the piston 44 of the vacuum booster 18. The piston 38 has a groove 46 in its outer perimeter to receive a O-ring 48 to provide a sliding sealed contact between the piston and the inner wall of the cylinder 28. The piston divides the interior of the cylinder 28 into a first chamber 50 and a second chamber 52. Sufficient gaskets or the like are used between the actuator 26, vacuum booster 18 and master cylinder 20 to provide an airtight connection therebetween. Port 32 opening into the first chamber 50 provides the only passage for air flow to and from the first chamber. Port 34, opening into the second chamber 52, provides the only passage for air flow to and from the second chamber.

A rod 54 is positioned between the piston 38 and the actuating piston 56 of the master cylinder 20. The end 58 of rod 54 adjacent the piston is enlarged and is received within a cylindrical recess 60 within the piston 38. The opposite end of the rod forms a threaded plunger 64 which is threadedly received by threaded portion 66, permitting the length of the rod 54 to be adjusted for a particular application. A brake return spring 68 acts between the end of cylinder 28 and the piston 38.

Air line 70 is connected to port 32 and extends to a connector assembly 72. Connector assembly connects line 70 to line 74 in the motor home 12. Line 74 is connected to the air brakes of the motor home. The connector assembly 72 allows for simple connection and disconnection of lines 70 and 74. Preferably, connector assembly 72 will include a valve closing off line 74 when it is disconnected from line 70 so that the air brakes of the motor home will operate when automobile 14 is not under tow. Port 34 is left open to atmospheric pressure.

When the automobile 14 is operated independently of the motor home 12, the normal hydraulic braking system of the automobile will be fully operable. The operator simply depresses the brake pedal in the normal manner. The pedal force is boosted with the vacuum booster 18 in the conventional manner and the braking forces are transferred through assembly 36 and rod 54 to the actuator piston 56 of the master cylinder 20. When the automobile 14 is connected to motor home 12 for towing, the lines 70 and 74 are connected. When the brakes of the motor home are applied, pressurized air passes through lines 74 and 70 to the first chamber 50. The pressure exerts a force on piston 38, which, in turn, exerts a force on rod 54 and the actuator piston 56 of the master cylinder to apply the brakes of the automobile.

The system 10 has significant advantages over past designs. The only modification to the automobile 14 is the mounting of the actuator 26 between the vacuum booster 18 and the master cylinder 20. Most automobiles will readily accept the addition of this compact actuator without relocating components in the engine compartment. The actuator permits normal actuation of the brake system of the automobile so that, once installed, it can remain throughout the entire service life of the automobile. The adjustability of the rod 54 permits a single actuator to be used for many vehicle applications.

Figure 4:
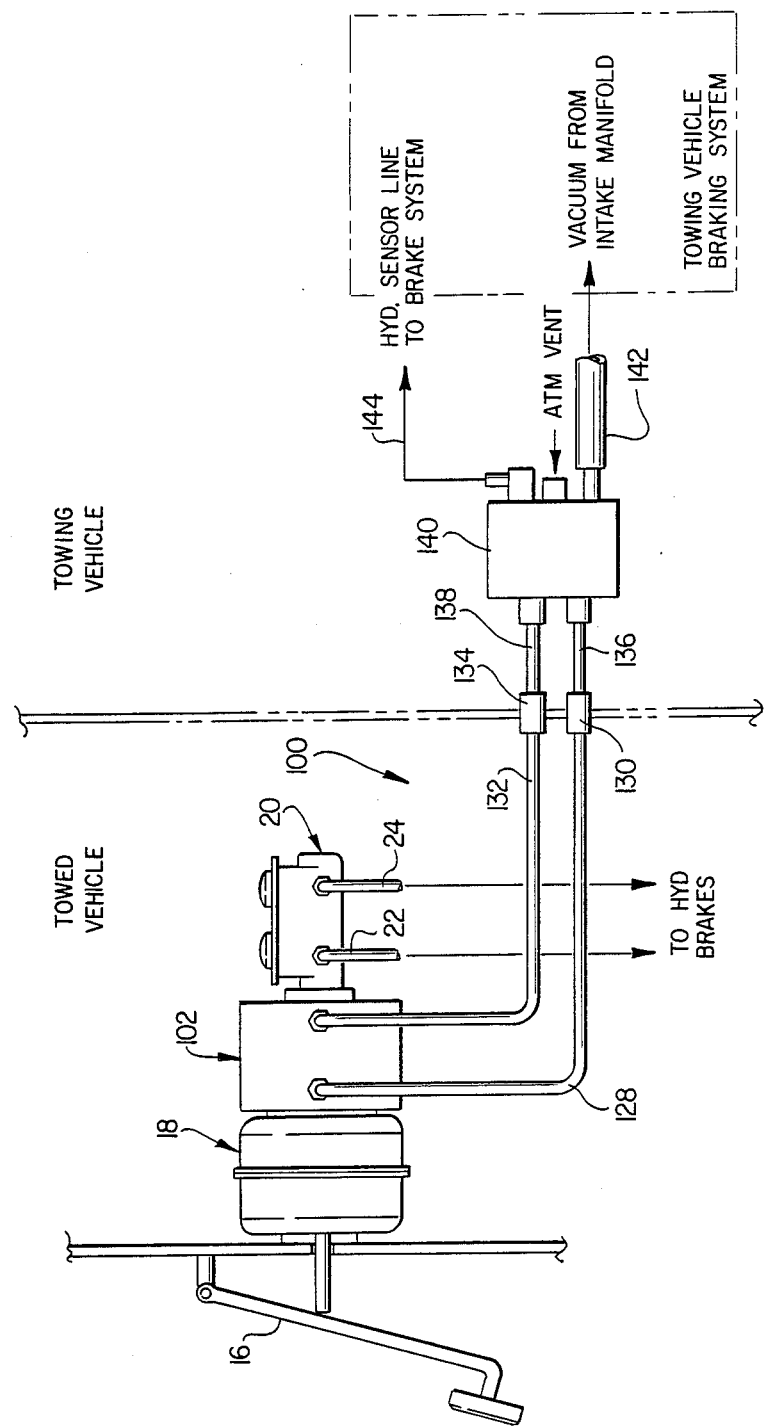
FIG. 4 is a schematic illustration of a second embodiment of the present invention for use with a towing vehicle having a hydraulic brake system.

With reference now to FIGS. 4 and 5, a second embodiment of the present invention will be described which forms a remote braking system 100. The remote braking system 100 is suitable for use when the motor home 12 has a hydraulic brake system. An actuator 102 is mounted between the vacuum booster 18 and the master cylinder 20. Actuator 102 includes a cylinder 104 with an inner wall 106. Ports 108 and 110 extend through the cylinder along its length. An assembly 112 is positioned within the cylinder which includes a piston 114 and a rod portion 116. As in actuator 26, the rod portion 116 cooperates with the piston shaft 42 of piston 44 in the vacuum booster 18. The piston 114 has a groove 118 which receives an O-ring 120 to provide for sliding sealed contact between the piston and the inner wall 106. Piston 114 divides the interior of cylinder 104 into a first chamber 122 and a second chamber 124. Rod 126 is essentially identical to rod 54.

A vacuum line 128 extends from port 108 to a connector assembly 130. Line 132 extends from port 110 to a connector assembly 134. Connector assemblies 130 and 134 attach lines 128 and 132 to lines 136 and 138, respectively, which enter a vacuum regulator valve 140 within the motor home 12. The connector assemblies 130 and 134 allow ready disconnection of the motor home from the automobile. The vacuum regulator valve has a line 142 extending therefrom to the intake manifold of the motor home. Also connected to valve 140 is a hydraulic line 144 extending from the hydraulic brake system of the motor home.

In operation, the automobile braking system 100 can be operated in its normal manner as discussed previously with system 10. However, when the automobile 14 is being towed, vacuum is drawn in line 142 from the intake manifold of the motor home 12. Through vacuum regulator valve 140, a vacuum is drawn in lines 132 and 136, and therefore in the first and second chambers 122 and 124, prior to application of the brakes of the motor home. As an equal vacuum is drawn in both chambers, no net force is exerted on the piston 114 other than that provided by the brake return spring 146. However, when the hydraulic brakes of the motor home are applied, pressure is exerted through hydraulic line 144 to the vacuum regulator valve 140. Valve 140 acts to controllably vent line 136 to atmosphere to create a pressure differential between the first and second chambers. This pressure differential generated by increasing the pressure in the first chamber relative to the pressure in the second chamber causes the piston to be forced against the rod 126, which in turn is forced against the actuator piston 56 of the master cylinder 20 to activate the brakes of the automobile. The valve 140 modulates the pressure differential between the first and second chambers in response to the hydraulic pressure in the braking system of the motor home, providing brake modulation in the automobile brakes corresponding to the force applied on the motor home brakes. Vacuum regulator valve 140 can, for example, be a valve sold by Pasco Mfg. Inc., 2520 Merrell Road, Dallas, Tex. as Model No. V7007CV. The effective area of piston 114 will typically be significantly larger than the area of piston 38 as the pressure differential in system 100 can never exceed the difference between atmospheric pressure, at 14.7 psi, and an absolute vacuum. Typically, the piston 114 will be of a size approximating the piston within the vacuum booster 18 with which it is associated.

While several embodiments of the present invention have been described in detail herein and shown in the accompanying drawings, it will be evident that various further modifications and substitutions of parts and elements are possible without departing from the scope and spirit of the invention.

I claim:

1. An apparatus for applying the brakes of the vehicle under two, the towed vehicle having a hydraulic braking system employing a master cylinder and a vacuum booster, the towed vehicle being towed by a towing vehicle, the apparatus comprising:
   an actuator cylinder mounted between the master cylinder and the vacuum booster;
   a piston in slidable sealing contact with the inner wall of the actuator cylinder, dividing the interior of the actuator cylinder into a first chamber and a second chamber;
   a first member operably connected to the vacuum booster for transferring brake application forces from the vacuum booster;
   a second member operably connected to the master cylinder for transferring brake application forces to the master cylinder, the first and second members being operably connected to transfer brake application forces from the vacuum booster to the master cylinder when the towed vehicle is independently operated; and
   means for inducing a pressure differential between the first and second chambers of the actuator cylinder in response to the application of the brakes of the towing vehicle to exert a force on the piston, which, in turn, exerts a force on the second member to apply the brakes of the towed vehicle.

2. The apparatus of claim 1 wherein the towing vehicle has air brakes, an air line connecting the air brakes of the towing vehicle with the first chamber of the actuator cylinder, the second chamber being exposed to atmospheric pressure, application of the air brakes on the towing vehicle applying the brakes of the towed vehicle.

3. The apparatus of claim 1 wherein the towing vehicle has a hydraulic braking system and a vacuum source, said apparatus further comprising a vacuum regulator valve for drawing a vacuum in the first and second chambers from the vacuum source, and controllably relieving the vacuum in the first chamber in response to pressurization of the hydraulic brake lines of the towing vehicle to apply the brakes of the towed vehicle.

4. The apparatus of claim 1 wherein said piston and first member are integral.

5. The apparatus of claim 1 wherein said second member comprises a rod having an adjustable length to adapt the apparatus to a range of master cylinder and vacuum booster configurations.

6. An apparatus for applying the brakes of a vehicle under two, the towing vehicle having air brakes, the towed vehicle having a hydraulic braking system employing a master cylinder and a vacuum booster, the apparatus comprising:
   an actuator cylinder mounted between the master cylinder and the vacuum booster;
   a piston in slidable sealing contact with the inner wall of the actuator cylinder dividing the interior of the actuator cylinder into a first chamber and a second chamber;
   a first member operably connected to the vacuum booster for transferring brake application forces from the vacuum booster;
   a second member operably connected to the master cylinder for transferring brake application forces to the master cylinder, the first and second members being operably connected to transfer brake application forces from the vacuum booster to the master cylinder to operate the brakes of the towed vehicle when operated independent of the towing vehicle; and
   means for communicating air pressure in the air brake system of the towing vehicle to the first chamber of the actuator cylinder, application of the brakes in the towing vehicle providing pressurized air to the first chamber to urge the piston against the second member to actuate the hydraulic brakes of the towed vehicle.

7. An apparatus for applying the brakes of a vehicle under tow, the towing vehicle having a hydraulic brake system, the towed vehicle having a hydraulic brake system employing a master cylinder and a vacuum booster, the apparatus comprising:
   an actuator cylinder mounted between the master cylinder and the vacuum booster;
   a piston in slidable sealing contact with the inner wall of the cylinder dividing the interior of the cylinder into a first chamber and a second chamber;
   a first member operably connected to the vacuum booster for transferring brake application forces from the vacuum booster;
   a second member operably connected to the master cylinder for transferring brake application forces to the master cylinder, the first and second members being operably connected to transfer the brake application forces from the vacuum booster to the master cylinder to allow operation of the hydraulic braking system of the towed vehicle when operated independently; and
   a vacuum regulator valve for evacuating air from the first and second chambers from a vacuum source, said vacuum regulator valve sensing the hydraulic pressure in the hydraulic brake system of the towing vehicle and venting atmospheric pressure air into the first chamber to create a pressure differential between the first and second chambers modulated by the hydraulic pressure in the braking system of the towing vehicle to exert a force on the piston and second member to apply the brakes of the towed vehicle.

* * * * *

UNITED STATES PATENT AND TRADEMARK OFFICE
CERTIFICATE OF CORRECTION

PATENT NO. : 4,756,390

DATED : July 12, 1988

INVENTOR(S) : Leon Meadows

It is certified that error appears in the above-identified patent and that said Letters Patent is hereby corrected as shown below:

Column 6, line 10, change "two" to --tow--.

Column 6, lines 11-12, change "emplying" to --employing--.

Signed and Sealed this

Sixth Day of October, 1992

Attest:

DOUGLAS B. COMER

*Attesting Officer*  *Acting Commissioner of Patents and Trademarks*